Oct. 29, 1968  S. C. LAWRENCE, JR  3,408,129
HYDROGEN DETECTOR WITH TEMPERATURE SENSING AND CONTROL MEANS
Original Filed Jan. 19, 1961  3 Sheets-Sheet 1

INVENTOR.
SAMUEL C. LAWRENCE, JR.
BY
Red Lawlor
ATTORNEY

INVENTOR.
SAMUEL C. LAWRENCE, JR.
BY
ATTORNEY

INVENTOR.
SAMUEL C. LAWRENCE, JR.

United States Patent Office 3,408,129
Patented Oct. 29, 1968

3,408,129
HYDROGEN DETECTOR WITH TEMPERATURE
SENSING AND CONTROL MEANS
Samuel C. Lawrence, Jr., 1814 S. 142nd Place,
Seattle, Wash. 98168
Continuation of application Ser. No. 83,704, Jan. 19,
1961. This application May 24, 1966, Ser. No. 559,655
10 Claims. (Cl. 316—1)

ABSTRACT OF THE DISCLOSURE

This is concerned with systems employing electron discharge tubes for measuring the hydrogen effusion properties of fluids. Hydrogen effuses from the fluid into the tube through its wall. Some of the hydrogen is captured by the wall. The tube is heated to an elevated temperature in order to expel the captured hydrogen from the wall before the next use and the temperature is controlled during use. An electron current flowing in the tube is used to measure the amount of hydrogen that has entered the tube during successive exposures to hydrogen effusing fluids.

This application is a continuation of my prior patent application Ser. No. 83,704, filed Jan. 19, 1961.

This invention relates to improvements in electron discharge devices employed for measuring the effusion properties of a fluid into a solid object.

It is well known that many metals, especially steel, are embrittled by virtue of hydrogen contained in them. The phenomenon resulting in such embrittlement is called hydrogen embrittlement. Whether such gas is present in molecular form or atomic form or both is still undetermined. Through there may be some question as to the form in which the hydrogen exists in the metal, the hydrogen that is present there may be referred to as dissolved or absorbed hydrogen.

Hydrogen that causes embrittlement of metal may enter the metal in various ways. For example, hydrogen may enter a piece of metal while the surface of the metal is being cleaned with a paint solvent. Hydrogen responsible for embrittlement may also enter metal during the course of oxidation of the metal surface that occurs while the metal is exposed to a humid atmosphere for a prolonged period. Such embrittlement reduces the strength and hence the life of any object made from such steel.

The rate at which hydrogen can diffuse from a fluid into a metallic object can be measured to some degree of accuracy by submerging an electron discharge device, often referred to hereinafter simply as a tube, or vacuum tube, or electron discharge tube, or electronic tube, in the body of the fluid and then determining the effect that such immersion has on the electronic characteristics of the tube. Phenomena of these types have previously been reported. See, for example, "Diffusion of Hydrogen from Water through Steel," by Francis J. Norton, Journal of Applied Physics, vol. 11, pp. 262ff, April 1940. See also United States Patent No. 2,526,038, issued to Herbert Nelson; United States Patent No. 2,790,324, issued to Maynard A. Babb; and United States Patent No. 2,921,-210, issued to Edward Schaschl, et al.

In such prior art devices, the electronic tube has been in the form of a diode, a triode, or a tetrode. Regardless of differences in structure between tubes, in accordance with the accepted theory of operation, the partial pressure of hydrogen within the envelope of the tube is increased while the tube is immersed in the fluid under investigation. This increase in pressure may be attributed to the migration of hydrogen ions through the wall of the tube shell to the interior surface thereof where the hydrogen ions combine with electrons in the tube wall to form hydrogen gas. The rate of diffusion depends not only on the diffusion and desorption characteristics of the wall but also upon the effusion properties of the fluid in which the tube is immersed. Since the effusion property depends upon the fact that the fluid is in contact with the wall of a metal object, it is sometimes referred to hereinafter as the hydrogen-effusion-into-metal characteristic of the fluid.

In utilizing such an electron discharge device, electrons emitted from a thermally emissive cathode are accelerated toward an accelerator electrode to a potential that exceeds the ionization potential of hydrogen. Accordingly, hydrogen gas bombarded by the electrons is ionized. A portion of the positive ions so formed reach the collector electrode where they collect their missing electrons. The resultant electron current flowing to the collector electrode from an external circuit is a measure of the pressure of the hydrogen atmosphere within the envelope of the electron discharge device. It is found that the current so measured depends not only on the pressure of the hydrogen gas in the envelope but also on the temperature of the envelope. In fact, it is found that the current is very sensitive to temperature, that is, it increases with temperature at a very high rate. Tests have shown that under many conditions, at least, the current (I) is related to the temperature (T) by a formula of the following type:

$$I = I_0 + K(T-T_0)^n$$

in which $n$ has a value of about 6 and where $I_0$ and $T_0$ are constants and where $K \geq 0$.

The fact that the current increases as about the sixth power of the change in temperature may be explained, in part, by the fact that when ions are present within the envelope in the same space with hydrogen molecules and hydrogen atoms, the forces between the various particles departs greatly from that existing when the hydrogen atmosphere is free of ions and electrons and is composed entirely of hydrogen molecules. Possibly, too, the rapid variation of current with temperature may be attributed partly to the effects of temperature on the absorption or desorption properties of the envelope of the tube as its temperature is elevated. The increased ion current may also be due to an increase in the rate at which hydrogen diffuses through the shell into the tube as the temperature is increased. Regardless of the explanation of the phenomenon, the simple fact is that the current is very sensitive to the temperature of the tube wall.

Accordingly, one of the objects of this invention is to provide an electron discharge device with means for measuring the temperature of the wall so that the temperature may be known at the time of measurement, and so that, if desired, the temperature of the wall may be maintained at a predetermined value.

Another object of this invention is to provide an electron discharge device used as a hydrogen detector with means for closely regulating the temperature of the wall in order that the temperature may be established at a predetermined value, thereby eliminating erratic variations in current readings that might otherwise result from changes in the temperature of the tube wall and erratic variations in the rate at which hydrogen gas is cleaned up by a getter, if present.

Still another object is to provide an improved arrangement for controlling the permeation rate by controlling temperature.

In this invention, a temperature-sensitive element is mounted in heat exchange relationship with the wall of an electron discharge tube in order to measure its temperature during operation, and in the best embodiment of the invention, heating or cooling elements are mounted in heat exchange relationship with the envelope of the tube in order to control the temperature. In this way, the irregularities in measurements of hydrogen effusion that might otherwise be produced because of uncontrolled or unknown temperature conditions are reduced or eliminated.

The foregoing and other objects of the invention, together with various features and advantages thereof will be understood from the reading of the following description, taken in connection with the accompanying drawings, wherein.

Figure 1:
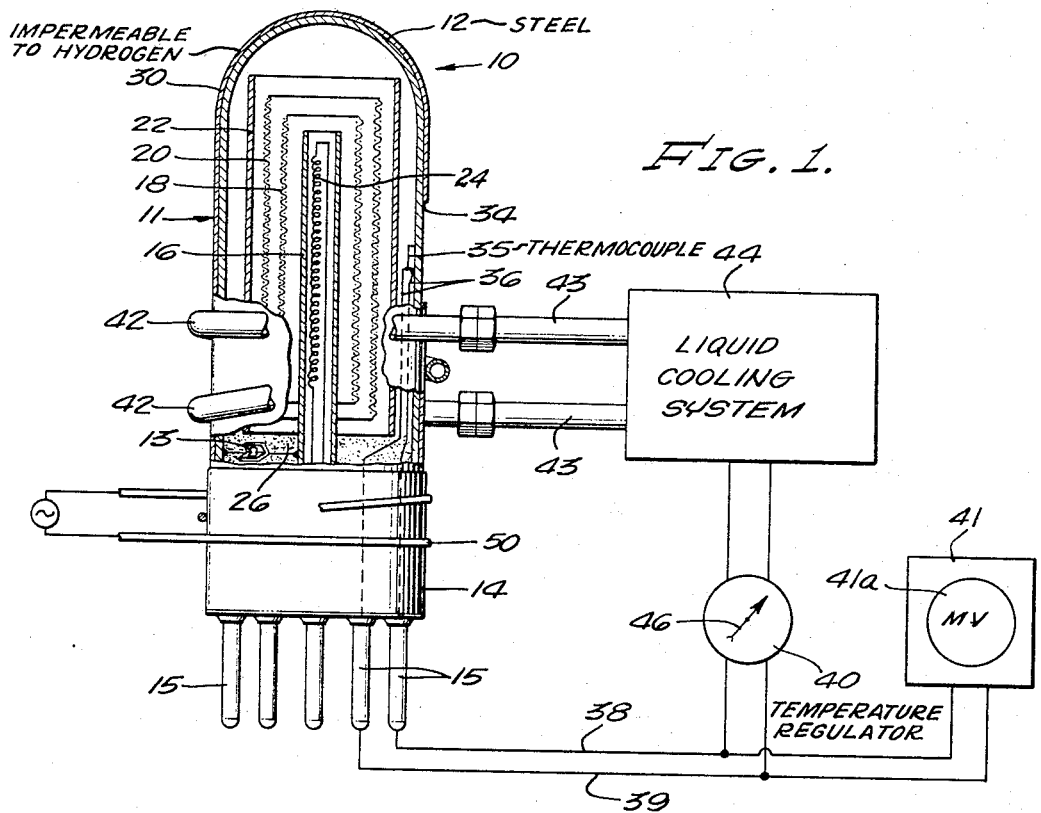
FIGURE 1 is a schematic diagram of a system employing this invention for the measurement of the hydrogen-effusion-into-metal properties of a fluid.
Figure 2:
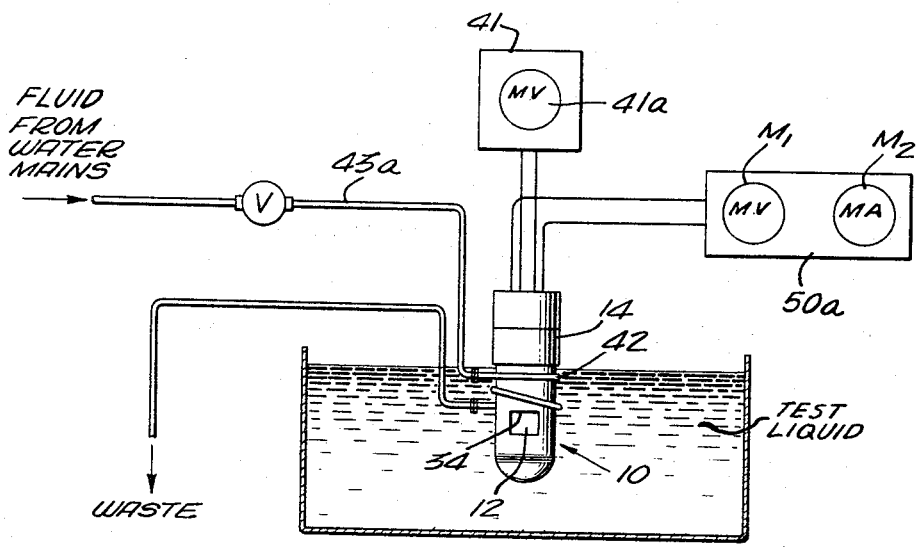
FIGURE 2 is a schematic diagram of an alternative system.

In FIGS. 1 and 2, there is shown a standard vacuum tube 10 known as a 6V6 tube 10 which has been modified for use with the present invention. This vacuum tube is provided with an envelope 11 which comprises a metal shell 12 sealed to an insulating base 14. The shell 12 is formed of a metal such as steel which is permeable to hydrogen. Such a tube comprises an indirectly heated cathode 16, inner and outer grids 18 and 20, and a plate 22. All of the electrodes are of cylindrical configuration and they are supported concentrically within the envelope 11. Each of the electrodes 16, 18, 20 and 22 and the shell 12 is connected electrically with an external metallic prong-shaped terminal 15. The two terminals of the heater 24 mounted in contact with the cathode 16 are also electrically connected to two external terminal prongs.

In the conventional method of manufacturing such a tube, the envelope 11 is evacuated by means of a vacuum pump and then sealed off against the ingress of air. At the time of sealing, the pressure within the envelope may be about $10^{-2}$ or $10^{-4}$ mm. Hg. In order to improve the operation of such a tube, the interior space is further evacuated by the evaporation of a charge 13 of gettering material within the envelope. Such a gettering material may, for example, consist of barium salts in combination with salts of aluminum or beryllium which when evaporated (flashed) produce free barium, or other material capable of absorbing residual gas remaining in the envelope after sealing. Upon evaporation, such gettering material forms a localized deposit on the interior wall of the tube, such as the deposit 26 shown at the lower end of the tube 10 of FIG. 1.

As is well known, such gettering material absorbs residual gases contained within the envelope of such a vacuum tube, thereby reducing the gas pressure to a much lower value, such as to a pressure of $10^{-7}$ mm. Hg. In some cases, the deposit of gettering material is at the upper end of the tube, instead of at the lower end, as shown. In other cases, the deposit of gettering material is on the side of the tube. In any event, during the course of manufacture of a series of tubes, the area covered by the deposit 26 of gettering material varies in a rather irregular manner from one tube to another. On the other hand, it is also possible to produce such high vacuums with special pumps or with getters that operate only when turned on—as with special auxiliary filaments. In such cases, the masking of gettering deposit (masking) on the tube surface is not necessary, but windows to control differences in gas permeation rates due to variations in shell structure or composition are required in order to give satisfactory results.

The outer wall of the shell 12 is coated with a hydrogen-impermeable layer 30 over a portion of the external surface thereof, but leaving a restricted portion of the shell free of such coating material, thus forming a hydrogen-permeable, or hydrogen-pervious, window 34. The layer on the coated portion of the shell thus forms a barrier to the flow of hydrogen into the interior of the tube, while the uncoated portion forms a hydrogen-permeable window which permits the flow of hydrogen into the interior of the tube through the window 34.

In the best mode of practicing the present invention now known, a temperature-sensing element such as a thermocouple 35 is mounted in contact with the interior surface of the shell 12. The two conductors 36–36 of the thermocouple are connected to two of the prong-shaped terminals 15. Two lead wires connected to these terminals lead to a regulator unit 40 which is utilized to regulate the temperature of the shell. Such a regulator 40 responds to changes in voltage produced by the thermocouple between the leads 38 and 39 when the temperature of the shell changes. In the present instance, this regulator is employed to control a cooling system for maintaining the temperature of the shell constant. A sensitive voltage measuring circuit 41 including a millivoltmeter or microvoltmeter 41a connected across the two leads 38 and 39 is employed to indicate the temperature.

In order to cool the shell to prevent the temperature from rising above a predetermined amount, cooling pipes 42 encircle the shell 12 in heat exchange relationship therewith. The cooling pipe may be in the form of a spiral arrangement located near the base 14 of the tube, though it may also be located elsewhere. Opposite ends of the cooling pipe 42 are connected to pipes 43 that lead to a supply of cooling liquid contained in a liquid cooling system 44. The liquid may be supplied by a refrigeration system, or it may simply be supplied from water mains.

In any event, the changes in voltage impressed upon the regulator 40 by changes in temperature detected by the thermocouple 35 are employed to regulate the cooling effect of the cooling water flowing through the cooling pipe 42. This regulation may be by regulating the temperature of liquid being circulated through a refrigerator. On the other hand, the regulating system 44 may simply be in the form of an automatic valve which regulates the rate at which cooling water of fixed temperature flows through the cooling pipe. In either event, the cooling system is controlled by the adjustable regulator 40 in response to the response of the thermocouple to increase the cooling effect of cooling water flowing to the cooling pipe when the temperature of the shell rises above a predetermined temperature or to decrease the cooling effect when the temperature of the shell falls below that temperature. An adjustable element indicated by the control element 46 in the regulator may be employed to set the temperature at any predetermined value.

To further enhance the effectiveness of the hydrogen detector of this invention, electric heating coils 50 are wrapped around the base 14. By flowing current through these heating coils, accumulation of condensed moisture around the prongs 15 is prevented. In this way, errors that might otherwise be introduced by the presence of such moisture are avoided. Such errors arise partly because of hydrogen effusion from water through the base and partly because of the increased conductivity that a film of moisture can introduce between prongs.

Figure 6:
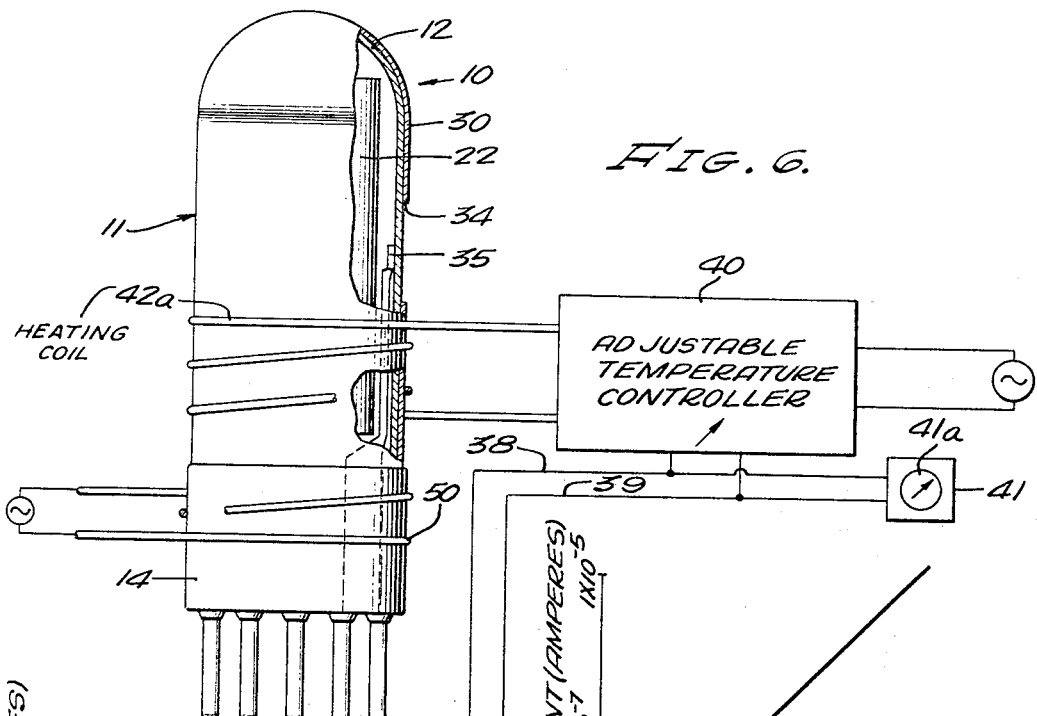
FIGURE 6 is a schematic diagram of another alternate embodiment of the invention.

In an alternate form of the invention, as shown in FIG. 6, the temperature is regulated by means of wire heating coils 42a instead of by the use of liquid cooling coils 42. Thus, in the modification of the invention illustrated in FIG. 6, heating wires 42a encircling the envelope 11 in heat exchange relationship therewith are supplied electric power from a source through an adjustable temperature controller 40 which is connected to the thermocouple 35 through the conductors 38 and 39.

Figure 5:
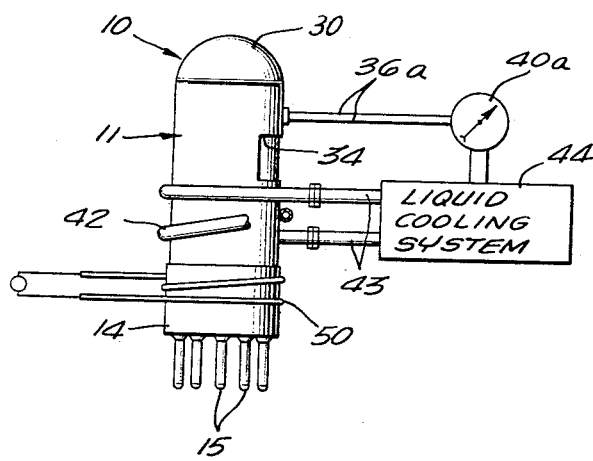
FIGURE 5 is a schematic diagram of an alternate embodiment of the invention.

It will be noted that in both of the embodiments of the invention illustrated in FIGS. 1 and 5, the temperature regulating tubes 42 are in proximate heat exchange relationship with the shell while the heating element 50 is in proximate heat exchange relationship with said base. With this arrangement the respective elements produce maximum cooling or heating effects respectively on the shell and the base.

In the system illustrated in FIG. 1, whenever the temperature of the shell 12 rises above a predetermined value, the regulator 40 causes the cooling water flowing through the tube 42 to absorb heat from the shell. This may be done either by flowing the water through more rapidly thus opposing the increase in temperature of the shell or else causes the water to flow through at a lower temperature thus likewise opposing the rise in temperature of the shell. Which method is employed depends on the nature of the heat regulating system. Alternately, instead of employing cooling water flowing through the tubes 42, heating water could be employed. In this case, the liquid cooling system 44 responds to a rise in temperature as sensed by the thermocouple 35 to reduce the temperature of the heating water or else to reduce its rate of flow so as to counteract the increase in temperature of the envelope.

In the system of FIG. 6, in a similar way, when the temperature of the shell is increased, as indicated by the response of thermocouple 35, the rate of flow of heat from the wire coil 42a to the envelope is decreased and when the temperature of the shell is reduced, as indicated by the response of the thermocouple, the rate of supply of heat from the wire coil 42a to the envelope is increased. In any event, the thermocouple 35 is employed to control a heat absorbing system of the type shown in FIG. 1 or a heating supply system of the type shown in FIG. 6 in order to maintain the temperature of the shell nearly constant.

In some cases it may be desirable to apply a thermocouple to the external surface of the shell, as indicated in FIG. 5. In this case, the leads 36a, 36a of the thermocouple may be connected directly to the regulator. Such an arrangement is especially desirable when use is made of a commercially available tube.

However, in the most effective arrangement, the thermocouple is mounted on the interior surface, as shown in FIG. 1. Such an internal mounting of the thermocouple provides a more accurate determination of the temperature of that part of the shell which is in direct communication with the atmosphere contained within the envelope. In order to enhance reproducibility of measurements, the thermocouple junction is mounted on a portion of the wall through which the hydrogen diffuses, that is at the window 34 if one is present.

In the most effective forms of the invention the temperature is regulated automatically. In somewhat less reliable but less costly system, the temperature is controlled by water flowing from the building mains through a pipe 43a in heat exchange relation with the shell as shown in FIG. 2. In this case the temperature is regulated by adjusting the flow rate by manual manipulation of the valve V.

From the foregoing description, it will be apparent that close temperature regulation for the purpose of maintaining the temperature of the wall of the electron discharge device has been provided.

In order to facilitate the making of reliable comparative measurements with different tubes, the walls of the tubes are partially coated with hydrogen-impervious material, such as epoxy resin, leaving an area of the shell uncoated. In this way, a hydrogen-permeable window 34 is formed in the shell. By suitable adjustment of the sizes of such windows, whether by the addition or removal of such coating material, all of the tubes of a given set may be made to have a predetermined sensitivity at a predetermined temperature.

More particularly, since different tubes may be used for making comparative tests, and since test results must be of uniformly repeatable accuracy, it is necessary that all tubes of a series must possess a predetermined standard of hydrogen permeability and sensitivity at a predetermined temperature. Therefore, in preparing a coated tube carrying, for example, a layer of the hydrogen-impermeable epoxy resin, and employing a thermocouple and cooling system, the tube is tested under standard operating conditions in a fluid of known properties to be sure that it has the required degree of hydrogen permeability at a predetermined temperature. If necessary, the area of the uncoated portion of the shell is increased or reduced, as may be needed, to establish equality of sensitivity of different tubes at the same temperature. But for tubes where it is not convenient to change the window area, or where sufficient change in permeability of the tube shell cannot be achieved efficiently by changing the window dimensions, greater changes in permeability can be achieved by varying the shell temperature. For example, a change in shell temperature of only 144° C. will result in a change in permeation rate of hydrogen (or any other gas in any other metal, for that matter) by a factor of $2^{10}$, that is 1024.

From the standpoint of the preparation of the metal surface of the envelope 12, either for proper diffusion of the gas, or for application of the hydrogen-impervious resin, the metal tube is cleaned to remove any paint coat which may have been applied by the manufacturer, or to remove oxidation products, or the like.

This cleaning process may include fine sand blasting, electropolishing for a few minutes with a sulphuric acid, glycerol solution, water rinsing, and a 5-second dip in a 6% hydrochloric acid solution to brighten and activate the metal surface, all followed by a distilled water rinsing, followed by acetone rinsing or spraying. In these operations, the tube base 14 and the joint between the base and the metal shell 12 are masked and sealed to protect them from moisture and from vapor.

Following coating of the desired proportion of the metal tube with the desired impervious resin, the latter is heat-cured or otherwise suitably cured. If, on test, after curing, too much resin is found to have been applied, appropriate portions may be stripped away or otherwise suitably removed.

In the above manner, each tube may be appropriately cleaned and painted or otherwise partially coated so that all tubes possess the desired standard of sensitivity of hydrogen diffusion rate at a given temperature.

Figure 3:
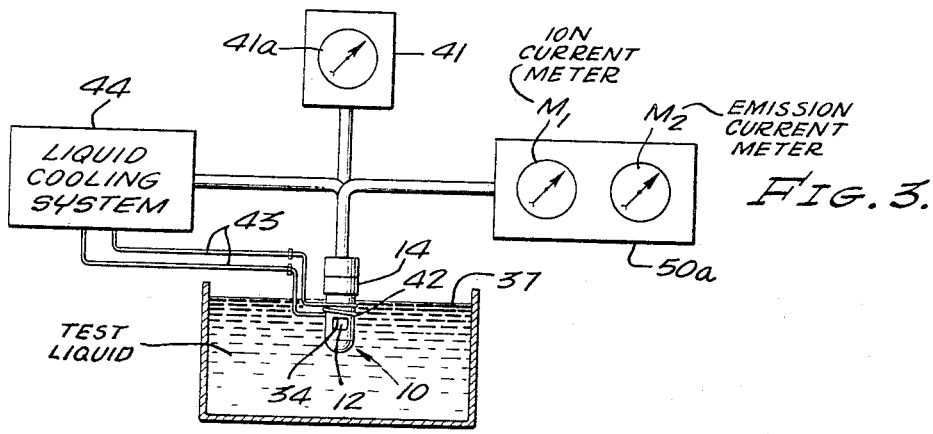
FIGURE 3 is a diagram showing how the invention is utilized to measure the hydrogen-effusion properties of a liquid.

In FIGS. 2 and 3, there is shown schematically an arrangement for measuring the hydrogen effusion properties of a liquid. In this case, the end of the shell 12 of the probe 10 is located beneath the main level 37 of the liquid under investigation, while the insulating base 14 is located above that surface. An electric cable into which the terminals 15 have been plugged connects the probe 10 with a measuring circuit 50a. This circuit 50a includes a first meter $M_1$ for measuring a characteristic of the tube 10 that depends upon the amount of hydrogen that has flowed into the space within the envelope of the tube through the window 34, and a second meter $M_2$ that is used for standardizing the electron emission of the cathode.

By making measurements of the hydrogen effusion properties of different liquids, information is thus obtained for monitoring the operations of a system in which metallic objects are treated with such liquids. By use of such a tube, liquids which have the lowest hydrogen-effusion-into-metal characteristics may be selected. Any hydrogen embrittlement of metallic objects treated by liquids can thus be minimized. For example, a series of tubes of equal sensitivity may all be painted with a common paint that is to be removed. Then each of these tubes may be partially submerged in a different liquid paint remover in the manner just described and the effect of the different paint removers on the different characteristics of the respective tubes measured. In this way, the differences in the hydrogen diffusion properties of the different paint removers may be ascertained. For best effects, the tests are all made at the same temperature. At least all the tubes should be at the same temperature. This invention makes it possible to accurately measure and to accurately control the temperature of the tubes during use.

Figure 4:
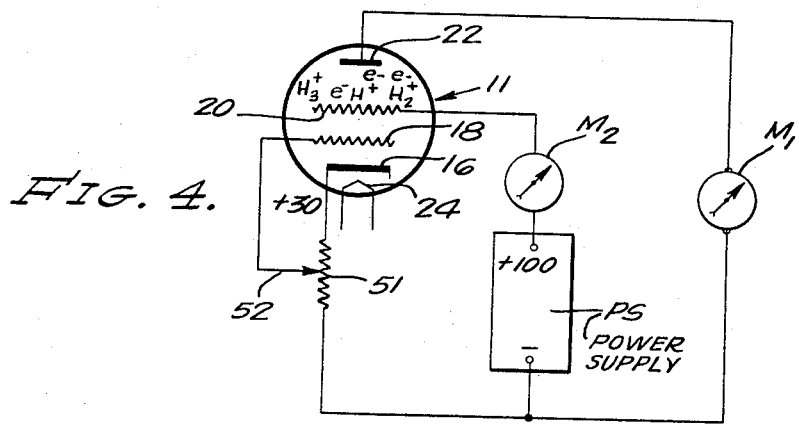
FIGURE 4 is a wiring diagram of a circuit of the type that may be employed for measuring the ionization current produced in the tube of FIGURE 1.

A measuring circuit of the type that may be employed for measuring the pressure of the hydrogen atmosphere formed within the envelope 11 of the tube of this invention is shown in FIG. 4. As indicated there, the cathode 16 is connected to one end of a potentiometer 51, the other end of which is connected to the negative terminal of a power supply PS. The inner grid 18 is connected to the slide wire 52 of the potentiometer. The outer grid 20 is connected through a meter $M_2$ to the positive terminal of the power supply PS, and the plate 22 is connected through a micro-microammeter $M_1$ to the negative terminal of the power supply PS. The voltage supplied by the power supply PS is of such a magnitude that electrons accelerated from the cathode 16 toward the plate 22 attain energies corresponding to those above the ionization potential of molecular hydrogen. In use the shell 12 is connected to another electrode such as the cathode 16.

The outer screen 20 is employed as an accelerator electrode. The plate 22 is employed as a positive charge collector, or positive ion collector. The inner grid 18 is employed for regulating the electron current formed within the tube under standard conditions. By manipulating the slider 52 on the potentiometer 51, the current flowing through the tube at any time may be standardized, thus compensating for differences in the electron emissive properties of cathodes 16 of different tubes, or for compensating for differences in the electron emissive properties of the cathode of any tube during the life of the tube. The effectiveness of the inner grid for this purpose arises from the fact that the 6V6 tube has a gradual, or remote, cut-off characteristic as distinguished from a sharp cut-off characteristic thus permitting a gradual change of current to be produced when the bias on the inner grid 18 relative to the cathode 16 is changed. The bias on the emission control grid may also be adjusted when the probe is in use in order to adjust its sensitivity. Over a wide range of operation the ion current indicated by meter $M_1$ is proportional to the emission current indicated by meter $M_2$.

In operation, hydrogen effusing from the liquid diffuses through the window 34 of the tube 10 to the inner surface thereof. At the inner surface the hydrogen is desorbed thus increasing the pressure of hydrogen gas existing within the envelope 11. As mentioned above, the hydrogen may flow through the wall in the form of a positive ion current, combining somehow with electrons on the inner surface of the envelope, thereby forming atomic hydrogen. Such atoms of hydrogen then combine within the envelope, probably at the surface, to form molecular hydrogen which thereby establishes a molecular hydrogen atmosphere within the envelope. Regardless of the explanation of the phenomena involved, the fact is that the pressure of hydrogen gas within the envelope is increased when the tube is immersed in a liquid which is capable of causing such diffusion of hydrogen into the envelope. By locating the window at a distance from the gettering material, direct absorption of hydrogen by gettering material as the hydrogen diffuses through the shell is avoided. Instead, the hydrogen is desorbed rapidly from the portion of the wall free of gettering material, thus maximizing the rate of flow of hydrogen into the space within the probe envelope.

In the process of accelerating electrons from the cathode 16 toward the accelerator grid 20, electrons travel at a high speed through the space between the cathode 16 and the accelerator grid 20. Thereafter, they are decelerated in the space between the accelerator grid 20 and the collector plate 22. Electrons bombard hydrogen in the space between the accelerator grid 20 and the plate 22 thereby ionizing the hydrogen gas. As a result, electrons represented by the symbol $e^-$ and hydrogen ions represented by the symbols $H^+$ and $H_2^+$ and $H_3^+$ are formed in the space within the envelope between the accelerator grid 20 and the collector plate 22. Such hydrogen ions, being positively charged, are repelled by the accelerator grid 20 toward the collector plate 22. When they strike the collector plate, they collect their missing electrons which therefore flow through the micro-microammeter $M_1$. At the same time, electrons formed in the ionization process are drawn toward the accelerator grid 20. These electrons flow to the positive terminal of the power supply. Hydrogen ions and electrons are also formed in the space between the two grids by virtue of the bombardment of hydrogen gas in this region by the accelerated electrons. These hydrogen ions flow to the inner grid 18, where they are discharged, and these electrons flow to the outer grid 20. The latter hydrogen ions and electrons do not contribute to the current flowing through the micro-microammeter $M_1$.

In practice, therefore, the magnitude of the current flowing through the meter $M_1$ is a measure of the pressure of hydrogen gas present within the envelope 11 at any time. In practice, it is observed that when a probe 10 exposed to fluid is first turned on, the magnitude of the current flowing through the meter $M_1$ changes as a function of time. For this reason, measurements are made after the current has become stabilized, or else has fallen below some predetermined value. Then the probe is immersed in the fluid under test and the rate at which the ion current increases is measured while the probe is exposed to the fluid.

In normal usage, when a probe is first energized the ion current rises rapidly to a high peak value which may exceed $10^{-7}$ amp. This current arises from the fact that the initial heating of the probe, especially the initial heating of the cathode, causes some of the gases that have previously been absorbed on various electrodes and the internal surface of the shell to be desorbed. While the probe remains warm these gases are absorbed by the gettering material gradually reducing the ion current to a value of $4 \times 10^{-9}$ amp. or less. The time required for the ion current to reach such a sufficiently low value to permit subsequent significant measurements to be made varies between 10 to 30 minutes, if the tube has once been previously properly prepared.

Figure 7:
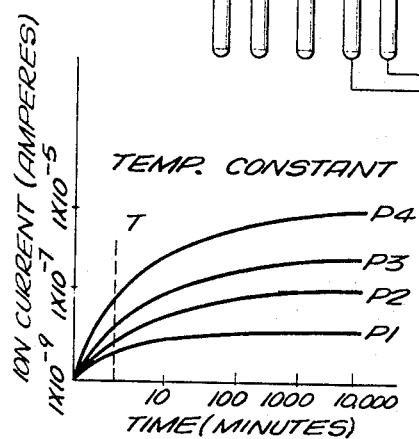
FIGURES 7, 8, 9 and 10 are graphs employed to explain some of the phenomena involved in the operation of the hydrogen detector of this invention.

In FIG. 7 a series of graphs is shown which represent in a general way the manner in which the ion current varies as a function of time at different gas pressures while the temperature is constant. Here it will be noted that in all cases the ion current increases fairly rapidly at the inception of operation but that gradually the current reaches a saturation value which depends to a large extent on the ultimate pressure of the gas in the tube. For most satisfactory results the ion current is measured at a predetermined time T after the inception of permeation and long before saturation is reached. In this way a measurement is obtained which depends on the permeation rate. Alternatively measurements are made at two such times and the rate of change of ion current determined therefrom. It is to be noted that as the pressure of the hydrogen gas increases the saturation value of the ion current also increases. The rate at which the saturation value is reached depends on the rate of permeation of hydrogen into the tube and the gettering rate of the getter, if one is used, or on the gas-cleanup speed of any other gas-cleanup mechanism used with the tube. Each of the graphs of FIG. 7 corresponds to measurements obtained with a different type liquid.

Figure 8:
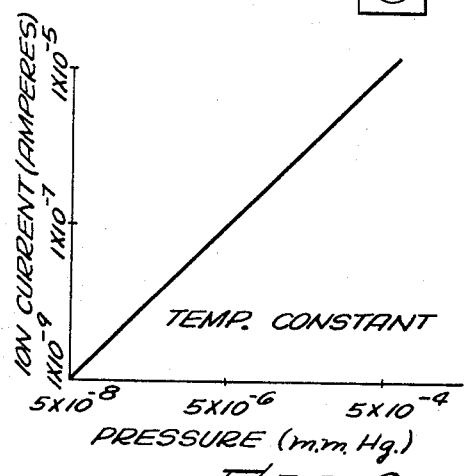

FIG. 8 is a graph that shows how the ion current varies in proportion to the pressure of hydrogen within the tube. The measurement of FIGS. 7 and 8 represent the increase in ion current caused by the presence of hydrogen. For example, if the ion current without hydrogen permeation is $1 \times 10^{-9}$ amp. and the total ion current when hydrogen is permeating the wall is $3 \times 10^{-9}$ amp., then the effective ion current is $2 \times 10^{-9}$ amp. Except in the case of FIG. 9, it is the effective ion current that is plotted in the various graphs.

When a tube is not in use, some of the hydrogen gas within the tube becomes adsorbed by the gettering material and some leaks outwardly through the wall if the tube is in a hydrogen free atmosphere, thus restoring the tube to a high vacuum condition. The tube may be restored more rapidly by maintaining it at an elevated temperature, say 190° C. When so restored, the tube may be used again. However, when the hydrogen absorption capacity of the gettering material is exhausted, the pressure of the hydrogen atmosphere remains high and the tube calibration is greatly altered, thus requiring replacement of the tube.

In one method of employing this invention, the shell 12 of the tube is heated to prepare it for reuse. In the heating process, hydrogen that has previously been absorbed in the wall of the shell is driven out of the shell rapidly. Some of the hydrogen released in this process leaks outwardly, some enters the tube. The rate of expulsion of hydrogen from the shell wall by this method is increased as the temperature is raised. In practice, with conventional gettering materials the temperature of the shell is raised to as high a point as possible without causing deterioration or evaporation of the gettering material. With a barium-salt gettering material a suitable temperature is 190° C.

The electrodes of the tube may also be maintained energized during the restoration process. Maintaining the tube at such an elevated temperature for about one hour is generally sufficient to restore the tube, so long as the gettering capacity of the getter has not been exhausted. It is useful in such a restoration technique to make use of the thermocouple for indicating the temperature and in many cases, it is desirable to employ one of the automatic temperature-regulating systems described, during tube restoration in order to prevent the temperature from exceeding the limit mentioned above which deterioration or evaporation of the gettering material may occur.

Figure 9:
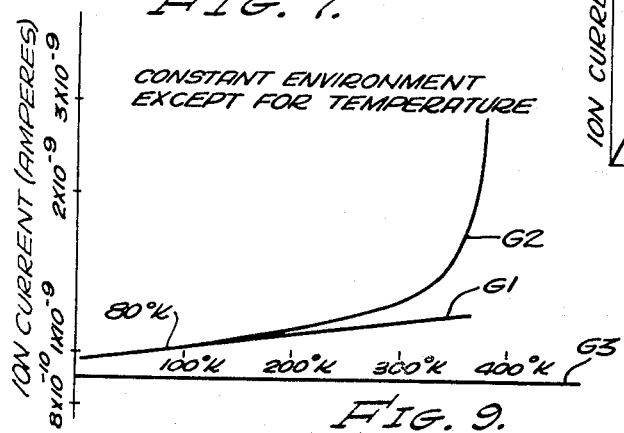

In FIG. 9, two Graphs $G_1$ and $G_2$ show how the value of the ion current varies as a function of temperature in a probe not subjected to hydrogen permeation. Graph $G_1$ shows how the ion current varies with temperature for a hydrogen detection probe that does not contain argon or other noble gas, while Graph $G_2$ shows how the ion current varies with temperature for a hydrogen detection probe that contains argon. Referring to FIG. 9, it will be noted that below the boiling point of argon, that is below 80° K., the two graphs coincide, but above this temperature, Graph $G_2$ lies above Graph $G_1$. Furthermore, Graph $G_2$ shows that the contribution of argon to the ion current changes rapidly with the temperature. For this reason, and because the ion current caused by any hydrogen that is present during permeation doubles for each 14.4° in temperature, it is important that the temperature at which the measurements of ion current are made be known and be accurately controlled.

Graph $G_3$ at the bottom of FIG. 9 represents the small ion current which is produced by the ejection of photoelectrons from the collector plate during operation. Such electron ejection is caused by bombardment of the collector plate by gamma rays that are generated by the low energy electrons striking the accelerator grid. It is to be noted that the photocurrent does not vary with temperature.

Figure 10:
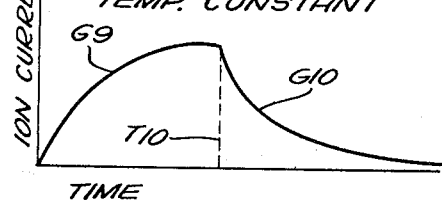

In FIG. 10 there is shown a graph representing how the pressure of hydrogen within the tube varies as a function of time. In the first part $G_9$ of the graph, the pressure rises gradually in an exponential manner as indicated in FIG. 9. Subsequently, if the tube is removed from exposure to the source of hydrogen at a time T, the hydrogen gas within the tube is absorbed by the gettering material, thus resulting in an exponential diminution of pressure with time as indicated by the part $G_{10}$ of the graph. In practice, it is often observed that deviations from the exponential decay characteristic of Graphs $G_{10}$ occur, especially at the commencement thereof. These deviations are believed to be due to the continued flow into the tube of the hydrogen absorbed within the shell wall, even though the external source of hydrogen has been removed.

Figure 11:
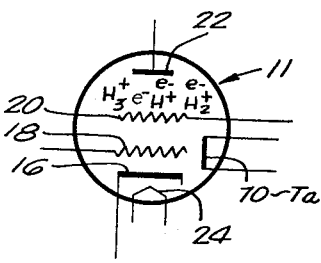
FIGURE 11 is a schematic diagram of a type of tube that may be employed in this invention.

Though the tube has been described above particularly with reference to the use of getters that are deposited by evaporation on the interior surface of the shell, it will be understood that filament-type getters may also be employed. Such a getter may be in the form of a tantalum filament 70 mounted within the tube, as shown schematically in FIG. 11. This filament like the operating electrodes of the tube are connected to prongs in the base of the tube. By the use of the temperature regulating system of this invention the tube is rapidly restored to a standard temperature suitable for making a test even though the tube may have become heated or cooled during the restoration process.

As mentioned above, an ion current represented by the Graph $G_2$ flows even though no hydrogen is present within the tube. In the best method of using the detector this current is reduced to a minimum value by eliminating as much of the nongetterable gas as possible from the tube during manufacture. In order to achieve this result during the manufacture of the hydrogen detector tubes 10, the electrodes and the getter charge are first mounted on the base, and the base is sealed to the shell, then the envelope is flushed through an opening therein with a getterable gas that is substantially free of any nongetterable components, then the envelope is evacuated to reduce the pressure of gas within it to a low value of less than about $10^{-3}$ mm. Hg, and then the charge of gettering material originally mounted within the envelope is evaporated to form a deposit on the interior surface. A getterable gas suitable for use in flushing is one which is composed of components selected from the group consisting of hydrogen and nitrogen. The non-getterable gases to be avoided are the noble gases such as argon, neon, krypton and the like. Of these argon is the most likely to be present if precautions are not taken in accordance with this invention because argon is the most common noble gas present in air. A gas suitable for use in flushing is, therefore, a getterable gas having a major portion thereof composed of components selected from the group consisting of hydrogen and nitrogen and being substantially free of noble gases. By manufacturing tubes in this manner the "zero" ion current caused by the presence of nongetterable gas is reduced to a minimum.

In practice it is found that regardless of the cause, the permeation rate just about doubles when the temperature of the wall of the tube rises 14.4° C. In addition over many of the temperature ranges in which such a probe is used, nongetterable gases such as argon cause an increase in ion current indicated by graph $G_2$ that is not attributable to hydrogen. It is thus seen that for accurate measurements it is desirable to maintain the wall at a temperature that lies within a fraction of a degree of a predetermined value. While it is not always necessary that the temperature be known, it is necessary that temperature be controlled accurately. By means of this invention variations in the ion current that would otherwise cause uncontrolled or undetermined changes in temperature between the time of calibration of the tube and the time of measurement by means of the tube are greatly reduced or completely eliminated. In the best method for using the invention the temperature is controlled automatically. But in a simpler method of using the invention, it is controlled manually.

In this specification the terms "effusion," "diffusion," "permeation," and "desorption" have been employed to describe various phenomena that affect the flow of hydrogen from a body of liquid through the shell of a probe into the space within the shell. The effusion property refers to a property of the liquid. It represents the ability of the liquid to supply hydrogen to the external surface of a probe or to the external surface of a solid object that is immersed in the liquid. This ability may be due to electrical characteristics, chemical characteristics, or others. The term "diffusion" refers to the migration of hydrogen from one point to another within the material composing the shell of the probe or the object. The term "desorption" refers to the ability of a surface to cause hydrogen contained within the wall or within the object to emerge from the surface in gaseous form. The term "permeation" refers to the over-all ability of a wall member to permit the flow of gas through the wall from the space on one side thereof external to the wall to the space on the other side thereof external to the wall. It is thus seen that in the flow of hydrogen from the liquid under test into the space within the shell of the probe, the hydrogen effuses from the liquid through the external surface of the shell into the body of the shell. There the hydrogen diffuses to the internal surface of the shell. At this point the hydrogen is desorbed thereby forming a gaseous atmosphere within the shell. The permeability of the shell depends upon the diffusion characteristics of the shell material and also the desorption characteristics of the internal surface, and also on the nature of the interaction between the external surface and the fluid undergoing investigation.

While the tube of this invention may be used in many ways and with many circuits, it is clear from the foregoing description that a novel hydrogen detection apparatus of greater reliability is provided by this invention. While the invention has been described with respect to only certain specific embodiments thereof, it will be understood that it may be applied in many other ways. For example, though the invention has been described as being applicable to a tetrode, it may also be employed with triodes and even with diodes. Furthermore, while the invention has been described with specific reference to the most important application thereof known, namely, to the measurement of the hydrogen effusion characteristics of liquids in which a tube is immersed, it will be understood that the invention is also applicable where the tube is immersed in gaseous fluids or other hydrogen-bearing atmospheres. It will also be clear that by suitable modification of materials, it may also be employed for the measurement of gases other than hydrogen. It is therefore to be understood that the invention is not limited to the specific embodiments of applications thereof described, but that it may be embodied in many other forms, and that various other materials may be employed, and that it may be used with other circuits and in other environments than those specifically described herein.

I claim:

1. In a method for using a hydrogen-detector tube to measure the hydrogen effusion properties of fluids and for restoring such tube for reuse, said tube having electrodes within the tube for hydrogen measurement and having a hydrogen-absorbing metal wall the steps which comprise:
    immersing a portion of said tube within a hydrogen-effusing fluid with the hydrogen-absorbing metal in contact with the fluid at a predetermined temperature below 100° C. whereby hydrogen is effused into the wall and some of the effused hydrogen is absorbed in the wall;
    removing said tube from said fluid; and
    expelling such absorbed hydrogen from the tube wall by restoration heating of the tube wall to an elevated temperature above said predetermined temperature, some hydrogen passing into the interior of the tube from said wall and some hydrogen passing out of the tube from said wall.

2. In a method as in claim 1, the steps of maintaining said electrodes energized during such heating, and measuring the temperature of the tube while being heated to such elevated temperature.

3. In a method as in claim 2, the step of automatically regulating the temperature of the tube during the restoration heating.

4. In a method as in claim 2, the steps of repeatedly restoring and reusing said tube by the method specified in claim 1, and wherein such reuse involves exposing said tube to a hydrogen effusing fluid only at a temperature lower than said elevated temperature whereby hydrogen is absorbed in the wall of said tube during such exposure.

5. In a method as in claim 1, the step of automatically regulating the temperature of the tube during restoration heating and measuring the regulated temperature.

6. In a method as in claim 1 wherein the tube contains a gettering material and the restoration temperature is held at a temperature at which the gettering material removes hydrogen from the space within the tube.

7. In a method of measuring hydrogen effusion by means of a hydrogen detector tube having electrodes within the tube for measuring ion current flowing between the electrodes in accordance with the amount of hydrogen within the tube and having a hydrogen-absorbing metal wall, the steps which comprise:
    immersing a portion of said tube within a hydrogen-effusing fluid with the hydrogen-absorbing metal in contact with the fluid at a predetermined temperature whereby hydrogen is effused into the wall and some of the effused hydrogen is absorbed in the wall;
    removing said tube from said fluid;
    expelling absorbed hydrogen from the tube wall by heating the wall to an elevated temperature above said predetermined temperature while removed from said fluid, whereby hydrogen is driven out of the wall of the tube into the interior of the tube;
    again immersing a portion of said tube within a hydrogen-effusing fluid with the hydrogen-absorbing metal in contact with the fluid only at a predetermined temperature below said elevated temperature whereby hydrogen is again effused into the wall and some of the latter effused hydrogen is absorbed in the wall;
    removing said tube from last mentioned fluid;
    and again expelling absorbed hydrogen from the tube wall by heating the wall to an elevated temperature above said predetermined temperature while removed from said latter fluid whereby hydrogen is driven out of the wall of the tube.

8. A method for measuring hydrogen effusion as defined in claim 7 wherein maintaining said portion of the tube being immersed within a hydrogen effusing fluid in both cases sufficiently long to enable hydrogen effusing from the fluid to enter the space within the tube;
    applying a voltage across said electrodes after hydrogen has effused through the wall of said tube into the interior thereof during each immersion;

and measuring the current flowing between the electrodes to ascertain the amount of hydrogen that has flowed into said tube during each immersion.

9. A method as defined in claim 8 in which different fluids are used in the successive immersions.

10. A method of measuring hydrogen effusion as defined in claim 9 in which both immersions take place at the same low temperature compared with said elevated temperature.

References Cited

UNITED STATES PATENTS 2,921,210    1/1960    Schaschl _____ 324—33 X

OTHER REFERENCES

Publication: Norton, F. J., Journal of Applied Physics, 324/33, vol. 11, April 1940, Pages 262–267.

RICHARD H. EANES, JR., *Primary Examiner.*